United States Patent
Misiewicz et al.

(10) Patent No.: US 6,638,154 B1
(45) Date of Patent: Oct. 28, 2003

(54) THRUST COLLAR FOR ENCASING NATURAL CASINGS, AND METHOD OF USE THEREOF

(75) Inventors: Grzegorz Misiewicz, Wronki (PL); Kenneth Leon Lebsack, Ankeny, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 10/278,618

(22) Filed: Oct. 23, 2002

(51) Int. Cl.$^7$ ................................................ A22C 11/02
(52) U.S. Cl. ........................................................ 452/35
(58) Field of Search .............................. 452/30, 31, 32, 452/46, 48, 39, 35

(56) References Cited

U.S. PATENT DOCUMENTS

| | | | | |
|---|---|---|---|---|
| 4,562,617 A | * | 1/1986 | Kollross | 452/39 |
| 5,445,560 A | * | 8/1995 | Meeker et al. | 452/39 |
| 6,066,035 A | * | 5/2000 | Hergott et al. | 452/31 |

* cited by examiner

*Primary Examiner*—Charles T. Jordan
*Assistant Examiner*—Judith A. Nelson

(57) ABSTRACT

A thrust collar for slidably mountable on an elongated hollow stuffing tube of a meat emulsion encasing machine, comprises a main body having a center bore and a radially extending annular flange, and a disk rotatably mounted on a forward end of the main body and having a center bore registering with the center bore on the main body and being adapted to engage an end of the tubular casing on a stuffing tube so that the disk can rotate with respect to the main body.

8 Claims, 3 Drawing Sheets

THRUST COLLAR FOR ENCASING NATURAL CASINGS, AND METHOD OF USE THEREOF

BACKGROUND OF THE INVENTION

Sausages and similar meat emulsion encased products are made by filling natural animal intestines or similar artificial casings with meat, which is then formed into links by twisting sections to narrow the casing and form the ends of sequential links. Modern sausage linking machines commonly employ a system whereby sections of casing are placed over and around lengths of stuffing tubes. As pumped meat emulsion exits the stuffing tube, it is packed into the casing. The casing is gradually filled from the initial end to the following end and is thereby drawn away from the end of the stuffing tube. As the casing is being filled with meat emulsion and being forced way from the stuffing tube, the encased meat product is twisted by machine into links of predetermined size.

The twisting of the casing into links is achieved by the encasing machine continually rotating the casing horizontally along the stuffing tube. As the filled casing exits the encasing machine, a linking device binds the casing at pre-determined distances and stops the rotation at that point. By binding and stopping the filled casing, a link division is formed at the location of the bind. A twist is added to the link juncture by the fact that the link itself has stopped rotating, but the rest of the unfilled casing continues to rotate relative to the new link. Because it is the unfilled casing that rotates, and not the link being formed, there is a tendency for the unfilled casing to twist about the stuffing tube and bind against it, which hinders production. This twisting and binding is a particularly common problem when filling natural casings.

It is therefore a principal object of this invention to provide a method and a means for filling natural casing while reducing or eliminating the rotational twisting and binding of the unfilled casing.

A still further object of this invention is to provide a thrust collar that is rotationally enabled such that as it applies longitudinal force to a casing along a stuffing tube a portion of the thrust collar will rotate with the casing and thereby reduce or eliminate the rotational twisting and binding of the unfilled casing.

A still further object of this invention is to provide a method and means whereby a rotationally enabled thrust collar may be manually or automatically controlled such as to urge a casing along the stuffing tube.

These and other objects will be apparent to those skilled in the art.

SUMMARY OF THE INVENTION

A thrust collar for slidably mounting on an elongated hollow stuffing tube of a meat emulsion encasing machine, comprising a main body having a center bore and a radially extending annular flange, and a disk rotatably mounted on a forward end of the main body and having a center bore registering with the center bore on the main body and being adapted to engage an end of the tubular casing on a stuffing tube so that the disk can rotate with respect to the main body.

DESCRIPTION OF THE PREFERRED EMBODIMENT

Figure 1:
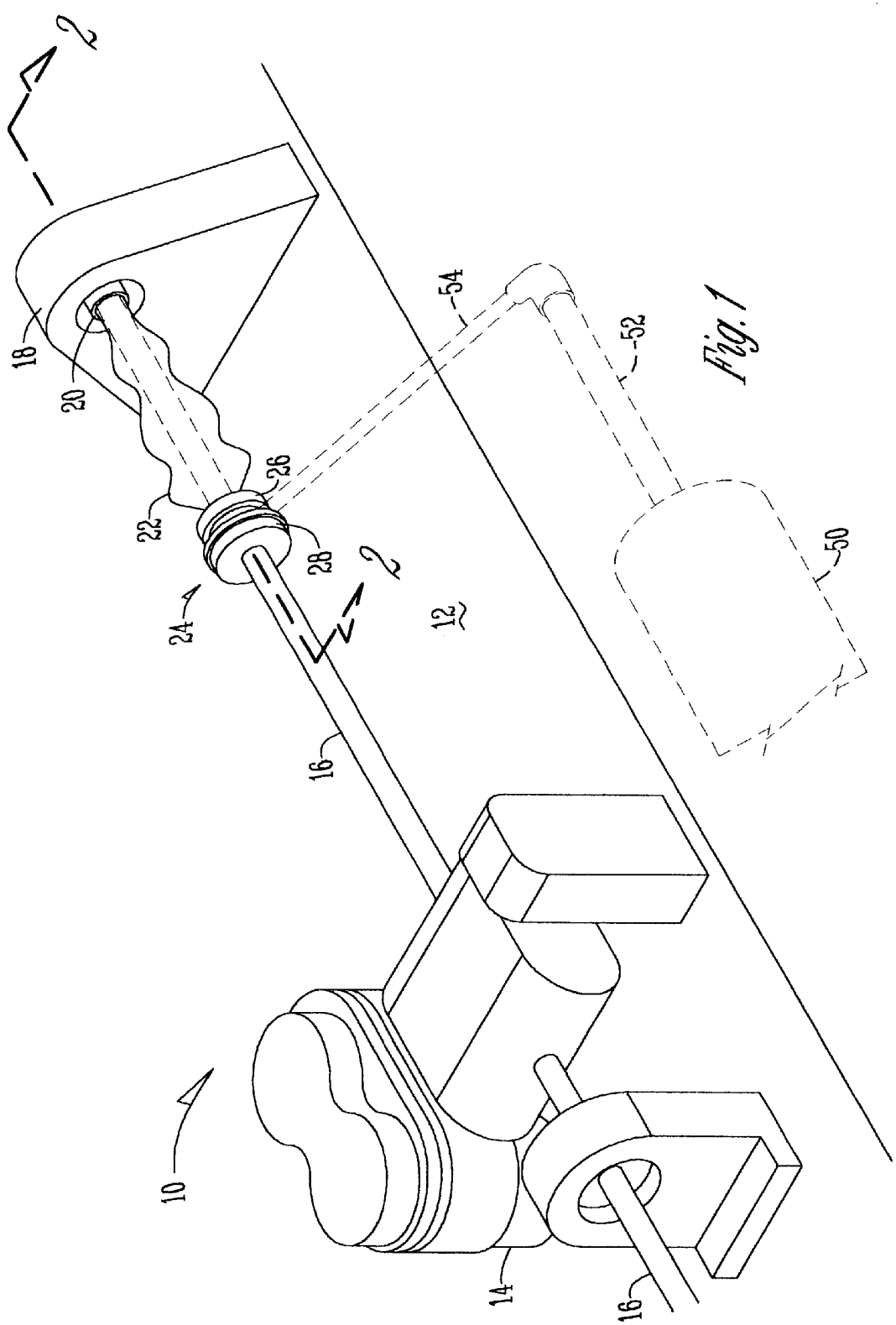
FIG. 1 is a perspective view of a meat encasing machine, which embodies this invention.
Figure 2:
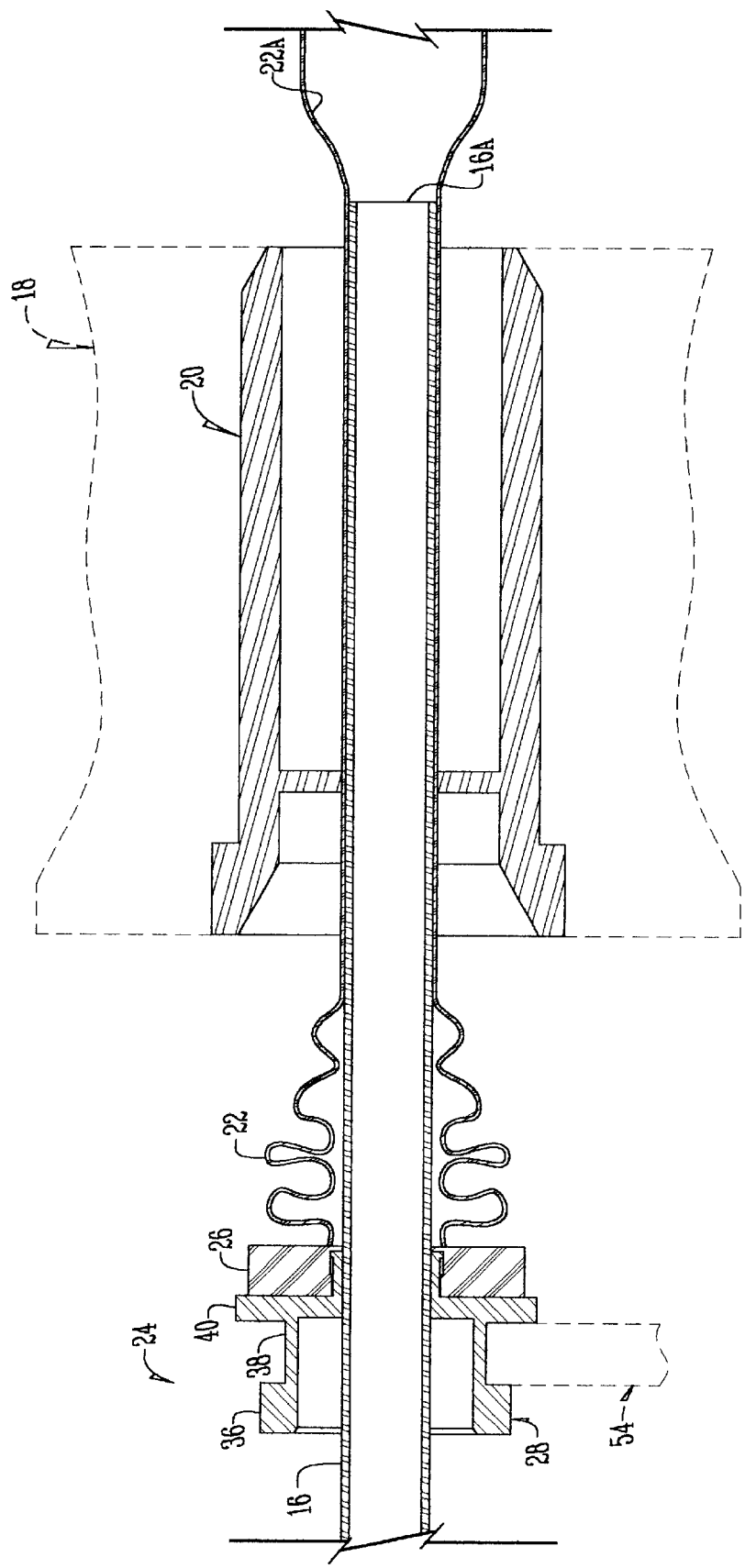
FIG. 2 is an enlarged scale sectional view taken on line 2—2 of FIG. 1.
Figure 3:
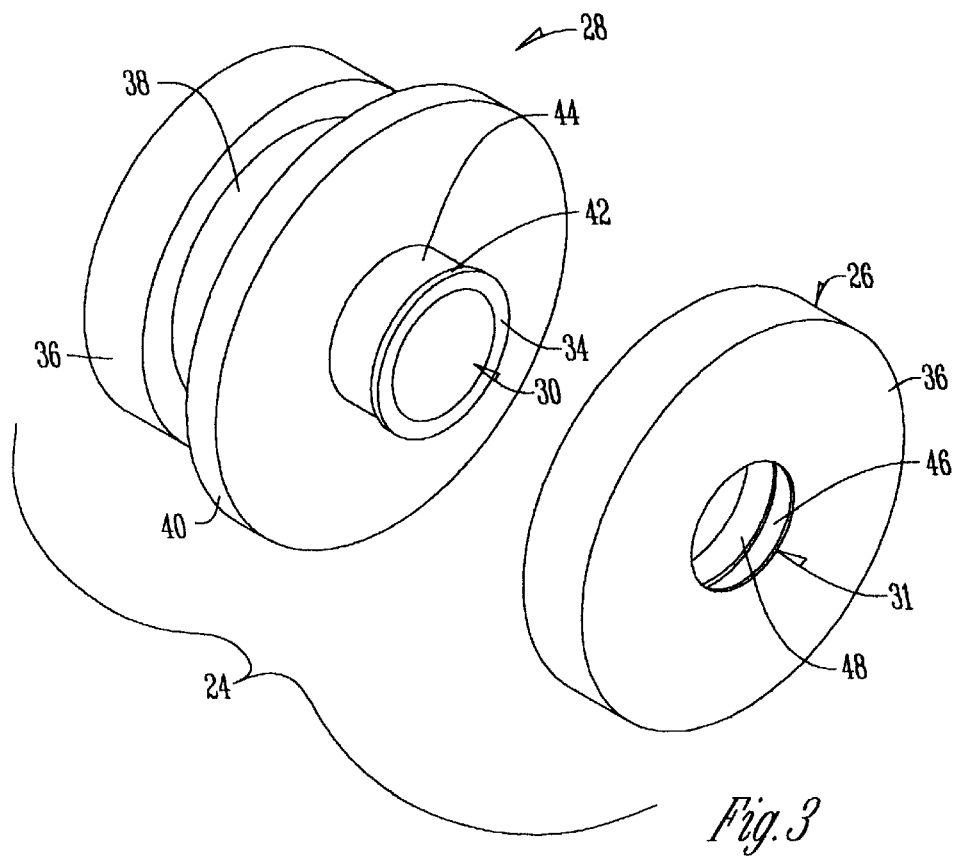
FIG. 3 is an exploded perspective view of the main thrust collar of this inventions.
Figure 4:
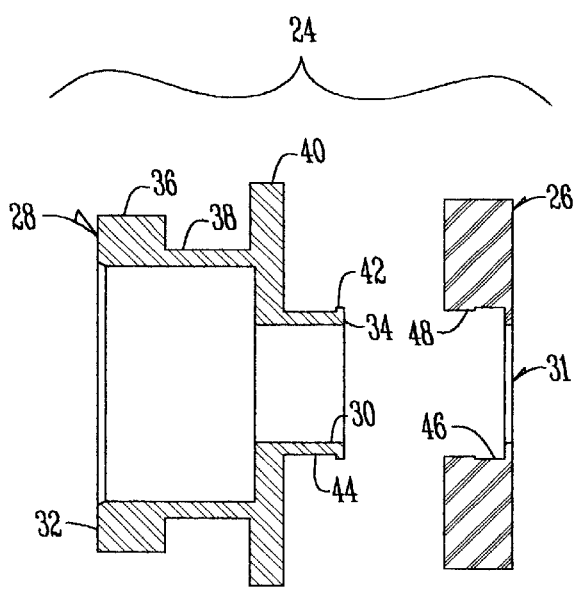
FIG. 4 is an enlarged scale sectional view of the thrust collar.

A meat emulsion encasing machine 10 (FIG. 1) has a frame 12 and a conventional meat emulsion pump 14 connected to a source of meat emulsion. A stuffing tube 16 with a discharge end 16A is operably connected to the pump 14. A twister housing 18 has a hollow rotatable chuck 20 that receives the meat emulsion casing 22 conventionally mounted on the stuffing tube 16. The hollow rotatable chuck 20 (FIG. 2) horizontally rotates the casing 22. The filled casing 22A exits the meat emulsion encasing machine 10 from the discharge end 16A of the stuffing tube 16 and is processed in a conventional manner. The foregoing components are all conventional and are well known in the art.

A thrust collar 24 is slidably located on the stuffing tube 16 behind the meat emulsion casing 22 and rearward of the hollow rotatable chuck 20. The thrust collar 24 is oriented along the stuffing tube 16 with a forward rotatable disk 26 placed against the casing 22. The forward rotatable disk 26 is rotatable attached to the main body 28. The main body 28 and the forward rotatable component 26 are slidably associated with the stuffing tube 16 such that as a horizontal pressure is applied to the main body 28, that pressure is transferred to the forward rotatable component 26 and the pressure is further transferred to the meat emulsion casing 22. The horizontal pressure transferred from the front rotational component 26 causes the meat emulsion casing 22 to be urged toward the hollow rotatable chuck 20.

The hollow rotatable chuck 20 is operatively connected to a conventional drive motor and drive linkage (not shown) whereby the chuck 20 constantly rotates about the stuffing tube 16 and in so doing rotates the meat emulsion casing 22 about the stuffing tube 16. As the casing 22 rotates against the thrust collar 24, any frictional drag that would tend to twist and bind the meat emulsion casing 22 around the stuffing tube 16 is substantially reduced by the forward rotatable disk 26, which rotates freely on the main body 28 on the thrust collar 24. With the casing 22 free to rotate against the disk 26 of thrust collar 24, any twisting and binding of the casing is reduced or eliminated, and the meat emulsion casing 22 is filled more efficiently.

The thrust collar 24 has a main body 28 having a center bore 30 sufficient to slidably encircle the stuffing tube 16. The main body 28 has a rearward end with a rearward flange 36 axially centered on the center bore 30. Forward of the rearward flange 36 is a groove 38 also axially centered on the center bore 30. A medial flange 40 is located forward of the groove 38 and is also axially centered on the center bore 30. A forward end 34 of the main body 28 has an annular rib 42 that is axially centered on the center bore 30. Rearward of the annular rib 42 is an area of constant external diameter 44 that extends rearward to the medial flange 40.

The thrust collar 24 has a forward rotatable disk 26 that has a center bore 30 sufficient to slidably encircle the stuffing tube 16. The disk 26 has an annular groove 46 located rearward of the center bore 30. The annular groove is of sufficient diameter to rotationally associate with the annular rib 42 located on the main body 28. Rearward of the annular groove 46 is an area of constant internal diameter 48 that is sufficient to slidably and rotatably associate with the area of constant external diameter 44 located on the main body 28 and sufficient to retain disk 26 on main body 28. When the area of constant internal diameter 48 is engaged over the annular rib 42 and thereon to the area of constant external diameter, the disk 26 is rotationally associated with the main body 28 and the stuffing tube 16.

While the thrust collar 24 can be manually moved on stuffing tube 16, a conventional air cylinder 50 (FIG. 1) having a piston rod 52 which is connected to thrust collar 24 by an arm 54 can be used to move thrust collar 24 in a longitudinal direction on the stuffing tube 16. The outer end of arm 54 is connected to the main body 28 of collar 24 in any convenient fashion. See FIG. 2.

It is therefore seen that this machine will achieve at least all of its stated objectives.

We claim:

1. A thrust collar for slidably mounting on an elongated hollow stuffing tube of a meat emulsion encasing machine, comprising:

a main body having a center bore and a radially extending annular flange, and a disk rotatably mounted on a forward end of the main body and having a center bore registering with the center bore on the main body and being adapted to engage an end of the tubular casing on a stuffing tube so that the disk can rotate with respect to the main body.

2. A meat encasing machine having an elongated meat stuffing tube associated with a meat emulsion pump, and having a discharge end longitudinally movably positioned within a hollow twisting mechanism, comprising:

a thrust collar slidably mounted on the stuffing tube, the thrust collar comprising a main body, and a disk rotatably mounted on a forward end of the main body so that the disk can rotate about the stuffing tube with respect to the main body.

3. The device of claim 1 wherein the thrust collar is operatively connected to a mechanical device wherein the mechanical device provides the longitudinal force.

4. The device of claim 1 wherein the thrust collar is operatively connected to a compressed air cylinder to provide the longitudinal force.

5. A method for filling meat emulsion casings, comprising:

forcing meat emulsion through a stuffing tube and out a discharge end using a meat emulsion pump that is operatively connected to the stuffing tube;

slidably and rotatably mounting a thrust collar with a forwardly rotatable disk over the discharge end of the stuffing tube and sliding the thrust collar back away from the discharge end to a distance at least sufficient to permit placement of a meat emulsion casing over the discharge end and along the stuffing tube with a rearward end in engagement with the rotatable disk on the thrust collar;

rotating the meat emulsion casing about the stuffing tube;

urging the casing longitudinally along the stuffing tube by pushing the thrust collar against the rotatable disk; and;

pressing the thrust collar against rearward end of the meat emulsion casing such that the disk is permitted to rotate with the rotating meat emulsion casing.

6. The method in claim 5 wherein the horizontal force applied to the thrust collar is applied manually.

7. The method in claim 5 wherein the horizontal force applied to the thrust collar is applied by a mechanical device.

8. The method in claim 5 wherein the horizontal force applied to the thrust collar is applied by a compressed air cylinder.

* * * * *